United States Patent
Wen (10) Patent No.: US 9,479,889 B2
(45) Date of Patent: Oct. 25, 2016

(54) SERVICE PLATFORM FOR GENERAL-PURPOSED MULTI-FUNCTIONAL DETECTORS

(71) Applicant: Kuei Ann Wen, Hsinchu County (TW)

(72) Inventor: Kuei Ann Wen, Hsinchu County (TW)

( * ) Notice: Subject to any disclaimer, the term of this patent is extended or adjusted under 35 U.S.C. 154(b) by 0 days.

(21) Appl. No.: 14/743,515

(22) Filed: Jun. 18, 2015

(65) Prior Publication Data

US 2016/0286334 A1    Sep. 29, 2016

(30) Foreign Application Priority Data

Mar. 24, 2015 (TW) .............................. 104109345 A (51) Int. Cl.
| | |
|---|---|
| *H04L 29/06* | (2006.01) |
| *H04W 4/00* | (2009.01) |
| *H04L 29/08* | (2006.01) |
| *H04L 12/24* | (2006.01) |

(52) U.S. Cl.
CPC .............. *H04W 4/001* (2013.01); *H04L 41/22* (2013.01); *H04L 67/34* (2013.01); *H04W 4/005* (2013.01)

(58) Field of Classification Search
CPC .... H04W 4/001; H04W 4/005; H04L 41/22; H04L 67/34

USPC ........................................................ 455/414.3
See application file for complete search history.

(56) References Cited

U.S. PATENT DOCUMENTS

2014/0264657 A1    9/2014    Gogoi
2014/0300490 A1    10/2014   Kotz et al.

FOREIGN PATENT DOCUMENTS

| EP | 2 759 802 A2 | 7/2014 |
| WO | WO 2014/143812 A2 | 9/2014 |

*Primary Examiner* — Amancio Gonzalez
(74) *Attorney, Agent, or Firm* — Muncy, Geissler, Olds & Lowe, P.C.

(57) ABSTRACT

Disclosed is a service platform for general-purposed multi-functional detectors that comprises a memory device to store a plurality of application programs; and a communication module to provide an application program to a plurality of mobile devices. The application programs, when installed in a mobile device, operate the mobile device to communicate with particular general-purposed multi-functional detectors and obtain at least one sensing parameter from the detectors. The detectors provide a detector ID code and at least one detection parameter. An application program includes at least one judgment rule, which comprises at least one event and one action corresponding to the event that includes a detection parameter of the detectors.

13 Claims, 5 Drawing Sheets

SERVICE PLATFORM FOR GENERAL-PURPOSED MULTI-FUNCTIONAL DETECTORS

FIELD OF THE INVENTION

The present invention relates to a service platform for general-purposed multi-functional detectors, in particular to a service platform that facilitates developers of application programs for general-purposed multi-functional detectors in providing the applications or services they develop.

BACKGROUND OF THE INVENTION

In recent years, all kinds of detectors manufactured using the MEMS (microelectromechanical systems) technology are widely used in industry, commerce and everyday life, in support of applications of, such as, surveillance and/or control functions. These detectors may be wired or wireless and provide a variety of electrical parameters such as voltage, current, frequency etc., that may be provided to various measurement or application circuits, to be used as equivalent physical, chemical, biological, and other types of measured parameters in generating measurement results or for further applications. These detectors are in small size, consume low power and often provide wireless communication capabilities. Combinations of different sensing parameters thereof are provided for sophisticated monitoring and control functions.

However, although the conventional detectors are smaller in size, most of them can only provide a small number of detecting functions. If a particular monitoring or control function needs to use more sensing parameters, mostly the sensing device designer would need to provide a plurality of detectors that perform different detection capabilities in one large circuit or a PCB. This definitely results in an increased volume of the sensing device, higher power consumption, and higher complexity. Design and manufacturing costs are thus increased.

To further reduce the size of the sensing device and to improve manufacturing efficiency, the industry has proposed the solution of single chip, multi-functional sensing device, wherein detectors of different capabilities are combined and provided in a single substrate.

EP2759802A2 discloses a multi-axis integrated MEMS inertial sensing device on single packaged chip. The MEMS device includes a three-axis accelerometer and a plurality of gyroscope, both integrated on a substrate. The sensing device may be used to provide a variety of sensing functions.

US 20140300490 A1 discloses a wearable electronic device comprising a processor with memory capability. The device is coupled to a body area network (BAN) and can be connected to the WAN. The device has firmware connectable to the WAN to download application programs and settings and to upload data to a server.

WO2014143812 A2 discloses a multi-modal fluid condition sensor platforms and system, used in the measurement of various parameters of a liquid circulation system in various modes simultaneously. The invention is applicable in liquid circulation systems such as a reciprocating engine and automotive vehicle transmission. Embodiments in this patent publication pertain to the following measurement modes: differential temperature comparison, differential magnetic sensor comparison, differential inductive sensor comparison, differential electrical impedance comparison, differential optical absorption comparison, US2014264657 provides a design that integrates a variety of detectors on a single semiconductor substrate. The invention discloses a monolithically integrated multi-sensor device. In one embodiment, formed on a single substrate is a variety of detectors, including, for example a magnetometer, an infrared detector, an accelerometer and a hygrometer.

U.S. patent application Ser. No. 14/698,392 relates to a dual-functional resonance magnetometer. The magnetometer measures a magnetic field applied to its mass block under a resonant mode and motion or acceleration of the mass block under a non-resonant mode. According to the embodiment, a filter is used to simultaneously produce values of the magnetic field and the acceleration, when working under the resonance mode.

From the above discussion of the prior art, it is appreciated that there is a strong demand in the industry for a device that provides measurement of multiple sensing parameters on one single substrate, particularly a silicon substrate. Developers have been working hard in response to such demand, to provide devices that integrate a variety of sensing features on one circuit board or a semiconductor substrate. However, the sensing devices so developed, which can be called "general-purposed multi-functional detectors," would be used in a product that includes other supporting hardware and/or software and simply provide particular detecting function or limited number of detecting functions that the general-purposed multi-functional detector is equipped. It is definitely a waste of the powerful general-purposed multi-functional detectors.

OBJECTIVES OF THE INVENTION

An objective of the present invention to provide a novel mechanism for the effective utilization of general-purposed multi-functional detectors and a service platform for the general-purposed multi-functional detectors.

Another objective of the present invention is also to provide a service platform for general-purposed multi-functional detectors that enables developers to develop a variety of application software and hardware, such that the general-purposed multi-functional detectors serve different detection functions in the respective applications, without the need to replace the detector.

SUMMARY OF THE INVENTION

The present invention provides a service platform for general-purposed multi-functional detectors. The service platform may be installed in a cloud server, i.e., a server system that connects to a high-speed communication network system and is equipped with powerful computing and memory capacity.

The invented service platform accepts requests from a plurality of mobile devices, to establish communication connections with the service platform for exchange of information. The exchange of information includes: providing the mobile device an application program, so that the mobile device may communicate with particular general-purposed multi-functional detectors; providing information obtained by the mobile device and relating to particular general-purposed multi-functional detectors and/or the application program to the service platform; and providing information provided by the service platform and relating to particular general-purposed multi-functional detectors and/or the application program to the mobile device.

The application program is a computer program that operates the mobile device to operate identify particular general-purposed multi-functional detectors and to provide at least one of the following functions:

1. To detect a general-purposed multi-functional detector and to obtain sensing parameters from the general-purposed multi-functional detector. The sensing parameters include one of specific sensing result of the general-purposed multi-functional detector.

2. To establish a communication link with a general-purposed multi-functional detector. Steps in establishing the communication link include the step of waking up a general-purposed multi-functional detector.

3. To provide setting data to a general-purposed multi-functional detector, in order to determine the function of the general-purposed multi-functional detector; and to deactive the settings.

4. To provide particular data to a general-purposed multi-functional detector and to obtain particular data from the general-purposed multi-functional detector.

The service platform may further provide a data storage function, to store at least one of a plurality of application programs, date and information associated with the general-purposed multi-functional detectors, and data and information associated with the mobile devices. The service platform may further provide data processing functions, including using data stored in the storage or obtained by the service platform to calculate or processing in accordance with predetermined rules. The processing functions may also be provided by an external service system, whereby results of such processing are obtained by the service platform service platform for general-purposed multi-functional detectors through a communication connection.

The service platform may further provide editing functions for the application programs, so that users may develop or edit a particular application program online. If the developer's application program has been developed offline, the service platform for general-purposed multi-functional detectors simply provides the developer setting functions, necessary in connecting the application program with the service platform. The setting functions may further include establishing relations between a particular application program with particular mobile devices and/or specific general-purposed multi-functional detectors.

Detectors useful in the present invention may be any type or form of general-purposed multi-functional detectors. Here, the "general-purposed multi-functional detector" refers to detectors that provide detection of at least two kinds of physical and/or chemical quantity. The multifunctional detectors or sensors of the conventional art, as described above, are good examples of the general-purposed multi-functional detectors. Other examples include detectors that provide at least two of the following detection functions: accelerometer, magnetometer, gyroscope, heart rate detector, global positioning system, sonic detector, optical detector, temperature and humidity detector, vibration detector, pressure sensor, surface pressure detector etc.

The general-purposed multi-functional detector needs to have communication capabilities, preferably the wireless communication capability. In some embodiments of the invented service platform, the communication capability required in the detector is the capability of signal transmission, only. Therefore, the basic structure of the general-purposed multi-functional detector should include a plurality of sensing modules, to respectively detect a plural kind of physical and/or chemical quantities; a signal transmission module for generating a detector ID code and detection results of the sensing module; and a power supply module for supplying electricity to the signal transmission module and the sensing module.

In the preferred embodiments of the invention, the detector may further comprise a processing module and a signal receiving module. The processing module includes a logic circuit for calculating a sensing result according to at least one sensing parameter and transmitting the sensing result via the signal transmitting module. The signal receiving module receives an external signal and provides the signal to the processing module for processing.

In some preferred embodiments of the present invention, the detector does not provide sensing parameters but only its detector ID code information to the external.

An application program provided to the mobile device uses an autorun function to install itself in the mobile device, so that the mobile device is equipped with the capability of communications with particular general-purposed multi-functional detectors and the capability of processing information provided by the general-purposed multi-functional detectors. In other words, the mobile device is transformed to a processing device of the application program. In order to provide such capability, the mobile device comprises a detector signal receiving module for receiving signals transmitted from the detectors; a communication module to establish communication connections with the service platform for general-purposed multi-functional detectors for exchange of information; a processing module to determine an action according to at least one judgment rule and to output an action instruction through the communication module; a memory device for storing ID codes of the plurality of detectors and at least one judgment rule; and a power module to supply electricity to the detector signal receiving module, the communication module, the processing module and the memory. In a preferred embodiment of the invention, the mobile device is a smart phone, a tablet computer or any other type of mobile device. With the communications module, processing module and memory embedded therein, the mobile device supports all functions needed in the application programs.

The at least one judgment rule used in the processing module of the mobile device is a judgment rule established by the application programs. The processing module determines an action according to at least one event and generates an action command. That is, a judgment rule includes at least one event and an action determined according to an inference rule using the event as premise. The premise of a judgment rule may include a plurality of events and a logical relationship between the events. The logic relationship may include one or more of "AND," "OR," "NAND" and the like. The premise of a judgment rule may further include a more complex logical operation, such as a plurality of judgment rules and/or a logical relationship between/among the judgment rules.

The service platform for general-purposed multi-functional detectors of the present invention provides editing functions for application program developers to develop, set parameters of or edit a particular application program online. To this end, the service platform for general-purposed multi-functional detectors provides an edition interface, preferably a graphical interface that provides certain tools for developers to select parameters useful in a specific application program. The tools may include: a tool to establish an application program, a tool to select particular general-purposed multi-functional detectors, a tool to select particular function(s) of a general-purposed multi-functional detector, a tool to set sensing parameters of a detector, a tool to select logical relationship between/among the sensing parameters and a tool to select action(s) corresponding to conclusion of an inference. Among them, the selected functions of a detector, the set sensing parameters, the selected logical relationship between/among sensing parameters may be referred to as "events," while the selected actions corresponding to the conclusion of an inference may be referred to as "actions."

In the preferred embodiment of the invention, useful general-purpose multi-functional detectors include a variety of types. Therefore, the tool to select particular general-purpose multi-functional detectors provides the capability of selecting a specific type of general-purpose multi-functional detectors, for developers to utilize. After the developer completes the development of an application program, the edition tools automatically add particular information of the selected general-purpose multi-functional detectors, such as type of the detector, representative information of detectors connectable to an application program etc., into the application program so developed.

The invented service platform for general-purpose multi-functional detectors may further provide a user interface for mobile device users, preferably a graphic interface, to allow users of mobile devices to log-in, query and store information relating to the mobile devices and particular application programs.

These and other objectives and advantages of this invention may be clearly appreciated from the following detailed description by referring to the following drawings.

DETAILED DESCRIPTION OF THE INVENTION

The present invention provides a service platform for general-purpose multi-functional detectors. The service platform may be installed in a cloud server, to make use of the powerful computing and storage capacity of the cloud server in the provision of a plurality of application programs for a large number of mobile devices to link and obtain the application programs, in order to execute the application programs in the mobile devices. The service platform for general-purpose multi-functional detectors provides communication linkages between the mobile devices and particular general-purpose multi-functional detectors, so that the application programs installed in the mobile devices are able to use a number of general-purpose multi-functional detectors in related detections and other utilizations relating to the detection. The application programs can utilize different functions or different combinations of functions of the same group of general-purpose multi-functional detectors in a variety of applications, simultaneously or at different times.

Figure 1:
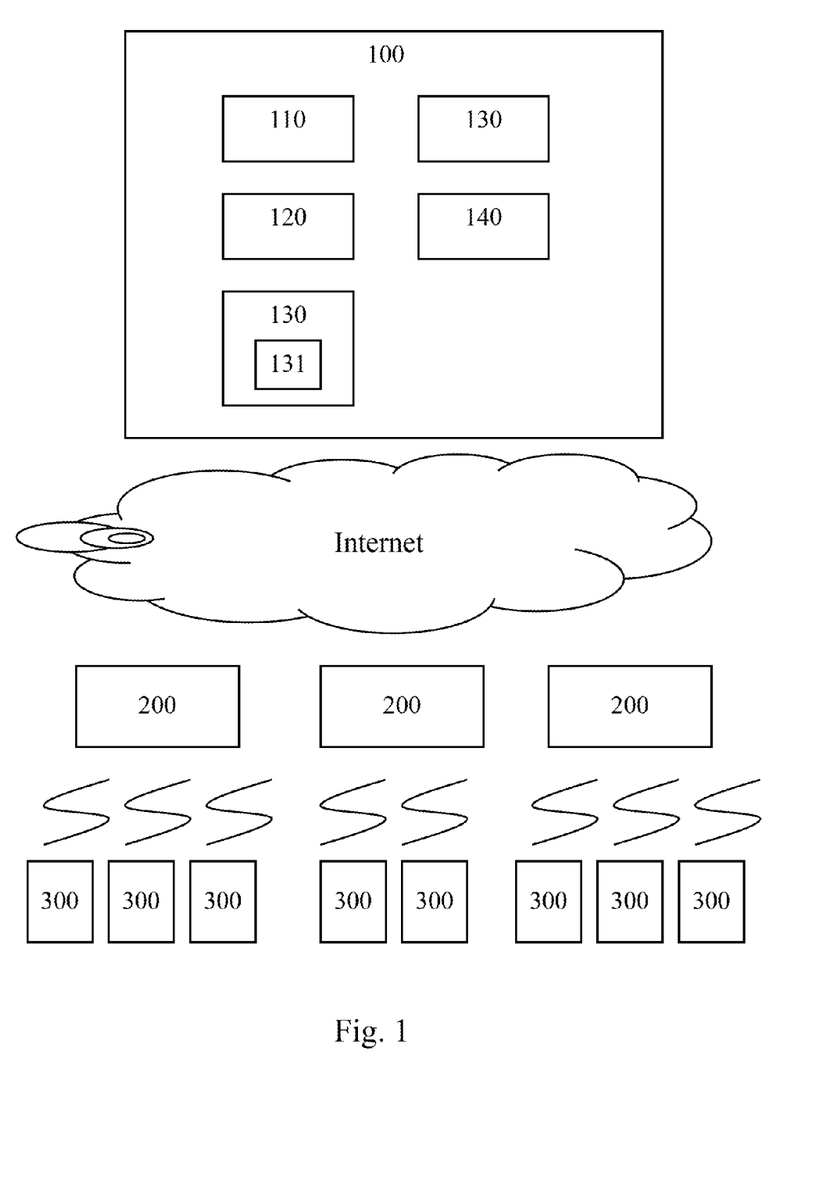
FIG. 1 shows the systematic diagram of the service platform for general-purpose multi-functional detectors of the present invention.

FIG. 1 shows the system diagram of one embodiment of the service platform for general-purpose multi-functional detectors of the present invention. As shown, the service platform 100 for general-purposed multi-functional detector of the present invention may be installed in a cloud server, to accept requests from a large number of mobile devices 200 for establishing communication connections and exchange of information. In the conventional technology, there are a variety of ways of information exchange that may be supported or provided by a service platform installed in the cloud server, in response to the request of a large number of mobile devices. However, in the preferred embodiments of this invention, information exchange between the service platform 100 and the mobile devices 200 basically includes providing an application program to the mobile devices 200, only. Application programs so provided may be a new software program or an updated or upgraded version thereof. The application programs are installed in the mobile devices 200 for execution, after they are provided to the mobile devices 200, either by an automated execution command or by a user manually. The technology that enables the provision of an application program by the cloud server and the installation of the application program in a mobile device as a new installation or an updated or upgraded version, is known to the art. Detailed description thereof is thus omitted.

In the present invention, the major function of the application programs is to provide the mobile devices 200 the ability of communicating with particular general-purposed multi-functional detectors 300. Herein the term "particular" may include one or more of the following concepts: 1) a specific type of the detector, i.e., detectors having a specific function, with the type being typically indicated by a detector code generated by the detector, 2) a group of detectors authenticated by or registered with the service platform 100 for general-purposed multi-functional detectors, typically indicated by a detector code generated by the detector, 3) a group of detectors registered with a particular application program, i.e., detectors having been registered with the service platform for general-purposed multi-functional detectors, upon establishment of the application programs therein, typically specified by a detector code of the detector or, sometimes, by a code generated by the application programs.

As a result thereof, after a application program is installed in particular mobile devices, it will only receive and/or process parameters, preferably sensing parameters, provided by at least one type of general-purposed multi-functional detectors classified as above.

In addition to providing application programs, exchange of information between the service platform 100 and the mobile devices 200 may further include: Providing information obtained by the mobile devices 200 and relating to particular general-purposed multi-functional detector 300 and/or the application program to the service platform 100; and providing information provided by the service platform 100 and relating to particular general-purposed multi-functional detectors 200 and/or the application program to the mobile devices 200. In application, examples of the information exchange may include: When a certain condition is satisfied, a mobile device 200 uploads sensing parameters of particular general-purposed multi-functional detectors 300 or results of processing by the mobile device 200 to the service platform 100, so that the service platform 100 records or stores the information provided. When a certain condition is satisfied, the service platform 100 provides an application program update information regarding the general-purposed multi-functional detectors, results of processing based on the above-mentioned sensing parameters or processing results or other application or commercial information to the respective mobile devices 200. Other possible ways of information exchange may be developed by those skilled in the art according to needs in particular applications.

As mentioned above, the application programs are specifically designed in relating to detection functions of particular general-purposed multi-functional detectors 300. According to the design of the invention, the main purpose of the service platform 100 is to manage the relationship between the plurality of application programs and the plurality of general-purposed multi-functional detectors, so as to provide developers useful tools in their design of application programs based on the creative employment, combination or deviation of the detection functions of the general-purposed multi-functional detectors, especially the "multi-functional" feature of the detectors. The application programs so designed and developed are then provided to the great number of mobile device users in the form of "application" (APP), so that the functions of the general-purposed multi-functional detector may be utilized to their extremes.

To achieve these goals, the application programs may be configured to operate a mobile device 200 to detect and identify particular general-purposed multi-functional detectors 300, after the application program is installed in the mobile device 200. In addition, the application programs may further provide the mobile devices with the capability of detecting and receiving sensing parameters from the identified particular general-purposed multi-functional detectors 300 and the capability of calculation and inference, using one or more sensing parameter of one or more detector 300 as bases or premises, to generate an action command. The detection functions of the mobile device 200 may include:

1. To detect a general-purposed multi-functional detector locating within a predetermined distance and to obtain sensing parameters from the detector. The sensing parameters may include parameters of a detection result of the general-purposed multi-functional detector. For example, a sensing parameter needed in an application program may be defined as: ID code or signal level of the detectors, physical or chemical quantity of a detection result, or result of comparison between the quantity and a threshold value and the like.

2. To establish a communication link with the general-purposed multi-functional detector. One example of such functions is providing a simple or complex command to the detector. The establishment of the communication link may include the step of waking up the detector.

3. To provide particular data to the general-purposed multi-functional detector, in order to determine (set) functions of the general-purposed multi-functional detector; and to deactivate the settings of the function. For certain general-purposed multi-functional detectors, it is sometimes necessary to set the parameters of the detectors, before they can execute particular detection functions. This is in particular true, when a particular detection function is provided by a plurality of detection modules of the detector. In such a case, setting of parameter shall be provided by the application program via the mobile device.

4. To provide particular data to the general-purposed multi-functional detectors and to obtain particular data from the general-purposed multi-functional detectors.

As shown in FIG. 1, the systematic architecture of the service platform 100 for general-purposed multi-functional detectors includes: a memory device 110 for storing a plurality of application programs; and a communication module 120 for communicating with a plurality of mobile devices 300, in order to exchange information, including providing an application program to the mobile device 200. The application program, after installation in the mobile device 200, enables the mobile device 200 to establish communication connections with particular general-purposed multi-functional detector 300, in order to obtain at least one sensing parameter from the general-purposed multi-functional detector 300.

The figure also shows that the service platform 100 for general-purposed multi-functional detectors also provides an editing module 130 for application program developers to set parameters for specific application program online. In addition, the editing module 130 may also provide developers tools to develop, set parameters for or edit a specific application program. The editing module 130 may include a graphical editing interface 131. The service platform 100 may further include a mobile device user interface 140, using a graphical interface to provide users of mobile devices 200 tools to log-in, query and store information relating to the corresponding mobile devices 200 and the corresponding application programs. The service platform 100 may further include a data processing module 150, to use data obtained by the service platform 100 in calculations and processing in accordance with particular rules.

In the embodiment shown in FIG. 1, the storage device 110 of the service platform 100 provides storage function for a plurality of application programs. The application programs are developed by individual developers and uploaded to the service platform 100 for general-purposed multi-functional detectors, for the large number of mobile device users to download. In a preferred embodiment of the present invention, the service platform 100 for general-purposed multi-functional detectors does not only provide download of application programs but also other additional services. Therefore, the storage device 110 may further be used to store information relating to the respective application programs, information relating to the plurality of mobile devices etc. Information stored therein may include those relating to software development, updates, downloads/installation, services, charges etc, so to provide useful information and tools for the application program developers. The information may also include historical information relating to detection and processing of the application programs, so to provide application program developers useful information and tools.

The data processing module 150 of the service platform 100 processes data stored in or obtained by the service platform 100 by way of calculating or inference in accordance with particular rules. This feature, though not the core technology of the present invention, provides additional applications and values to this invention. Processing as provided here corresponds mainly to the extended functions of the respective application programs, in particular, those not suitable for the mobile devices to process and defined by the software developer as functions to be provided by the service platform 100. Specific examples include application programs where search functions are needed. The data processing module 150 may further provide extended functions to the service platform 100, e.g., processing functions derived from processing results of a particular application program in a particular mobile device. Suitable examples include an advertising function, i.e., providing solutions information to particular mobile devices according to a predetermined parameter. This processing function can also be implemented by an external service system (not shown).

In such a case, the service platform 100 for general-purpose multi-functional detectors establishes communication connection with the external service system via the communication module 120, provides related data and parameters to the external service system and obtain the processing results after the processing of the external service system.

The communication module 120 provides the plurality of mobile device 200 communication connections. In a preferred embodiment of the present invention, the communication module 120 provides a web page for each mobile device 200 to connect by using an Internet browser and to select a desired application program for downloading to the corresponding mobile device 200. Such architecture is similar to the commercially available download sites for application software, such as GooglePlay®, Apple Market® and so on. Details thereof are omitted.

The editing module 130 provides editing functions for the application programs, for application program developers to develop or edit particular application programs. In a preferred embodiment of the invention, most of the application programs are offline developed in other development tools. Thus, the editing module 130 provides only setting function for the developer to couple the already developed application programs with the service platform 100 for general-purposed multi-functional detectors. The setting function may further include setting the relationship between particular application programs and particular general-purposed multi-functional detectors 200 and/or particular mobile devices 300. Details of settings of the application programs will be described below.

To further illustrate the service platform for general-purposed multi-functional detectors of the present invention, features of the general-purposed multi-functional detectors suitable for the present invention shall be described first. Detectors applicable in the present invention are not limited to any type or form of the general-purposed multi-functional detectors. A general-purposed multi-functional detector useful in the present invention may be any detector that provides at least two of the following detection functions: For example, accelerometer, magnetometer, gyroscope, heart rate detector, global positioning system, sound detector, optical detector, temperature and humidity detector, vibration detector, pressure detector, surface pressure detector and the like.

General-purposed multi-functional detectors useful by the application programs may be divided into three categories:

1. Detectors that provide no detection capabilities: In many applications, sensing parameters generated by a detector are in fact not necessary. Such applications include those that make judgments based on the ID code generated by the detector and/or strength of signals generated by the detector, only. For example, in the determination of position, distance etc. of a detector, such information would suffice. Therefore, signals generated by a component that has no detection function, such as a wireless transmitter, may also be used in certain applications of the invention.

2. Detectors with signal transmission capabilities, only: These detectors have a detection function and an ability to provide their detector ID codes and sensing parameters to external.

3. Detectors with communication capabilities, preferably wireless communication capabilities: In addition to the detection capabilities and the signal transmission capabilities, these detector further accept commands from the mobile device and perform a specific operation.

Considering that one major objective of the service platform for general-purposed multi-functional detectors of the present invention is to provide developers useful tools to develop a variety of application programs, the general-purposed multi-functional detectors are preferably those equipped with a plurality of detection capabilities and the communication capabilities.

Figure 2:
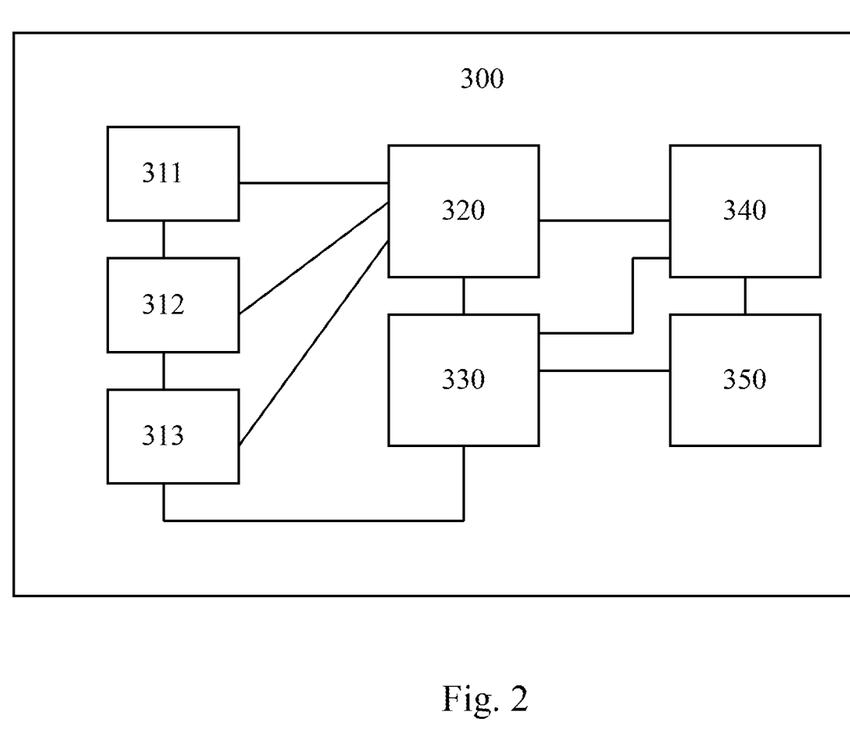
FIG. 2 shows the block diagram of a general-purpose multi-functional detector useful in this invention.

FIG. 2 shows the block diagram of a general-purposed multi-functional detector 300 useful in the present invention. As shown, the general-purposed multi-functional detector 300 includes a plurality of sensing modules 311, 312, 313, to respectively detect a plurality of physical and/or chemical quantities; a signal transmission module 320, to generate a detector ID code and results of detection of the sensing modules 311, 312, 313; and a power supply module 330 to supply electricity to the signal transmission module 320 and the sensing modules 311, 312 313.

In the preferred embodiments of the invention, the detector may further comprise a processing module 340 and a signal receiving module 350. The processing module 340 comprises a logic circuit to calculate a sensing result based on at least one detection result of the sensing modules 311, 312, 313 and to transmit the sensing result via the signal transmission module 320. The processing module 340 is particularly useful, when a particular sensing parameter used in an application program is the result of a mathematical or logical operation that involves a plurality of other sensing parameters. The signal receiving module 350 may receive an external signal and provide the signal to the processing module 340 for processing. The external signal may be, for example, a wake-up signal. General-purposed multi-functional detectors with such architecture and functions are widely available in the market. The aforementioned multi-functional detector of the prior art can also be used in the present invention. In addition, the combinations of several prior art single-functional detectors that provide multi-functional detection may can also be used in the present invention.

Since the general-purposed multi-functional detectors have the architecture and provide the functions as described above and since the application programs are coupled with specific general-purposed multi-functional detectors, after an application program is provided to a mobile device 200, the application program will use its automated execution function, such as "autorun," to install itself in the mobile device 200, so that the mobile device 200 is equipped with the functions of communicating with particular general-purposed multi-functional detectors 300 and processing data transmitted by the general-purposed multi-functional detectors 300. In other words, the mobile device 200 is transformed to a processing device for the application program installed therein.

Figure 3:
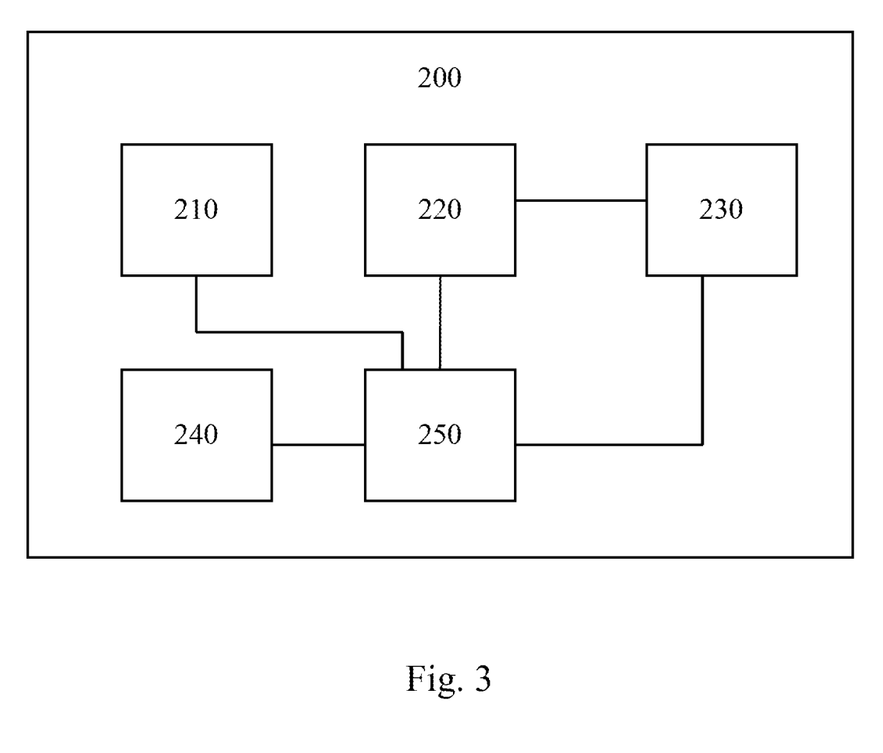
FIG. 3 shows the block diagram of a mobile device useful in this invention.

To provide this capability, the mobile devices need to have the capabilities to receive signals and to process the received signals. FIG. 3 is the block diagram of a mobile device 200 useful in the present invention. As shown, the mobile device 200 includes: a detector signal receiving module 210, to receive signals of particular detectors 300; a communication module 220 to connect the service platform 100 for general-purposed multi-functional detectors for exchange of information; a processing module 230, to determine according to at least one judgment rule and to output an action command via the communication module 220; a memory device 240 for storage of ID codes of the plurality of detectors 300 and the at least one judgment rules and a power supply module 250 to supply electricity to the detector signal receiving module 210, the communication module 220, the processing module 230 and the memory device 240. In the preferred embodiments of the invention, the mobile device is one of a smart phone, a tablet computer or any other portable communication device. The communication elements, processing elements, memory elements etc. embedded in the mobile device support all the functionalities required in the application programs. Due to such mobile communication devices are mature and commercially available products and the ability to install the above-mentioned capabilities in mobile devices is also a conventional technique, details thereof are thus omitted here.

Commercially available micro detector components or other types of detectors are usually equipped with a short-distance wireless signal transmission capability, for provision of sensing results through the conventional short-distance wireless communication channels, such as the Bluetooth channel, the radio frequency channels etc. As a result, the mobile device 200 is able to receive signals of the respective detectors 300 through one of these short-distance wireless communication channels.

As described above, the application software programs are primarily used to determine an action and generate an action command through a logical or mathematical operation in accordance with at least one event associated with a particular general-purposed multi-functional detector and at least one judgment rule. Therefore, the application software programs are primarily used to execute the at least one judgment rule. A judgment rule includes at least one event and an action determined according to results of an inference based on the event. In addition, the judgment rule may further include a logical relationship between/among the plurality of events, such as "AND," "OR," "NAND" and the like. In a more complex application, the judgment rule may also include, such as, a logical relationship between/among a plurality of judgment rules.

In order to provide useful tools for developers to develop application programs in the service platform 100 for general-purposed multi-functional detectors of the present invention, the editing module 130 provides an editing interface 131, preferably a graphic editing interface, that provides useful tools for application program developers to select parameters needed in a specific application program. The tools provided in the editing interface 131 may include:

Tools to establish an application program: An editing tool in the form of webpage may be provided to allow the developer to input name of a new program in order to establish an application program. After the developer selects this function, the editing module 130 provides the editing webpage. After the developer inputs name of the new program, a subsequent editing page is shown. If the developer has completed the development of the application program, the editing page simply allows the developer to upload the completed application program for registration and setting. In such a case, no further editing pages will be shown.

Tool to select particular general-purposed multi-functional detectors: A webpage is provided for the developer to select, in order to define types of detectors useful in the application program.

Tool to select particular function(s) of a general-purposed multi-functional detector: A webpage is provided for the developer to select, in order to define functions of the selected detectors to be used in the application program.

Tool to set sensing parameters of a detector: A webpage is provided for the developer to select, in order to define sensing parameters and related thresholds of the selected detectors to be used in the application program.

Tool to select logical relationship between/among the sensing parameters: A webpage is provided for the developer to select, in order to define logical relationships between/among sensing parameters, sensing results and a corresponding action of the application program.

Tool to select action(s) corresponding to conclusion of an inference: A webpage is provided for the developer to select, in order to define an action generated by the application program.

Among them, the selected functions of a detector, the set sensing parameters, the selected logical relationship between/among sensing parameters may be referred to as "events," while the selected actions corresponding to the conclusion of an inference may be referred to as "actions."

According to the design of the invention, in the preferred embodiments, the editing module 130 automatically adds predetermined information associated with the general-purposed multi-functional detectors to the application program, upon completion of the application program by the developer and saves the information in the file of the application program. The information so added may include representative code of the type of the detectors and representative codes of detectors connectable to the application program. Thus, a mobile device installed with the application program is able to determine accordingly whether a detector signal represents a sensing parameter that needs to be processed by the mobile device.

The editing interface 131 preferably provides templates of application program for developers to select and use. When the application program is installed in a mobile device, simple graphical interface may be provided for user of the mobile device to select, in order to construct a variety of applications of the detectors.

As described above, an application program applicable in the present invention includes at least one event and at least one action generated by an inference based on the event. In a preferred embodiment of the invention, the event may be a detector ID code provided by a detector and/or sensing parameters provided by a detector and/or results of process based on the sensing parameters. Specifically, the event may be result of a judgment made in accordance with one or more detector ID code and/or sensing parameters and/or threshold of a sensing parameter. Applicable parameters may include, for example: strength of the wireless signal (received signal strength indication, RSSI), gravity, angular velocity, gas pressure, brightness, temperature, humidity, sound, reading of a timer and the like.

In the preferred embodiments of the present invention, actions inferred to by the judgment rules may include: means for reminding a user or triggering another module, such as, generating an alarm (including values of sound volume, rhythm or frequency), sending a short message (including representative code of receiver and content to be sent), vibration (including amplitude, rhythm), displaying a message or warning light (including contents of message), generating an odor etc. Actions to generate digital data, such as photography, sound recording, video recording and recordation of data, may also be included.

Action commands generated by the application may be provided to a mobile module, typically the mobile device 200, for execution. For example, the action command may operate the mobile device 200 to establish a communication link or network communication link; and to generate a particular request and/or to provide particular information, after the communication link or network communication link is established. The action may also include operating a camera module of the mobile device 200 to execute a photographic operation according to the action command. The action may also include operating a display module of the mobile device 200 to display specific information in accordance with the action command. And so forth.

In order to provide developers useful tools for development of application programs, in the preferred embodiments of the invention, the editing module 130 provides a simple editing interface 131, for developers to utilize event parameters, action parameters, as well as parameters of logical relationships between/among events, provided in the editing interface 131 or else, to assign desired applications. This allows the developers to make good use of the plurality of detector functions provided in the system by associating their detection functions, in order to implement a variety of sensing/action functions. The logical relationships mentioned above may include: "AND," "OR," "XOR," "NOT," "NAND," "NOR" and "XNOR" and so on.

The editing interface 131 may provide a variety of event icons for developers to select. It may also provide a variety of action icons for developers to select. The editing interface 131 may further provide icons of logical relationship between events for developers to select. The editing interface 131 may provide fields of judgment rules for developers to determine contents of the judgment rules. A plurality of judgment rules may be stored in the storage device 110. The editing interface 131 may provide a selection interface for developers to activate or deactivate particular judgment rules.

The service platform 100 for general-purposed multi-functional detectors may also provide a mobile device user interface 140, preferably a graphical interface, for users of the mobile devices to log-in and to query and store information relating to the mobile device 200 and particular application programs.

EMBODIMENTS

Figure 4A:
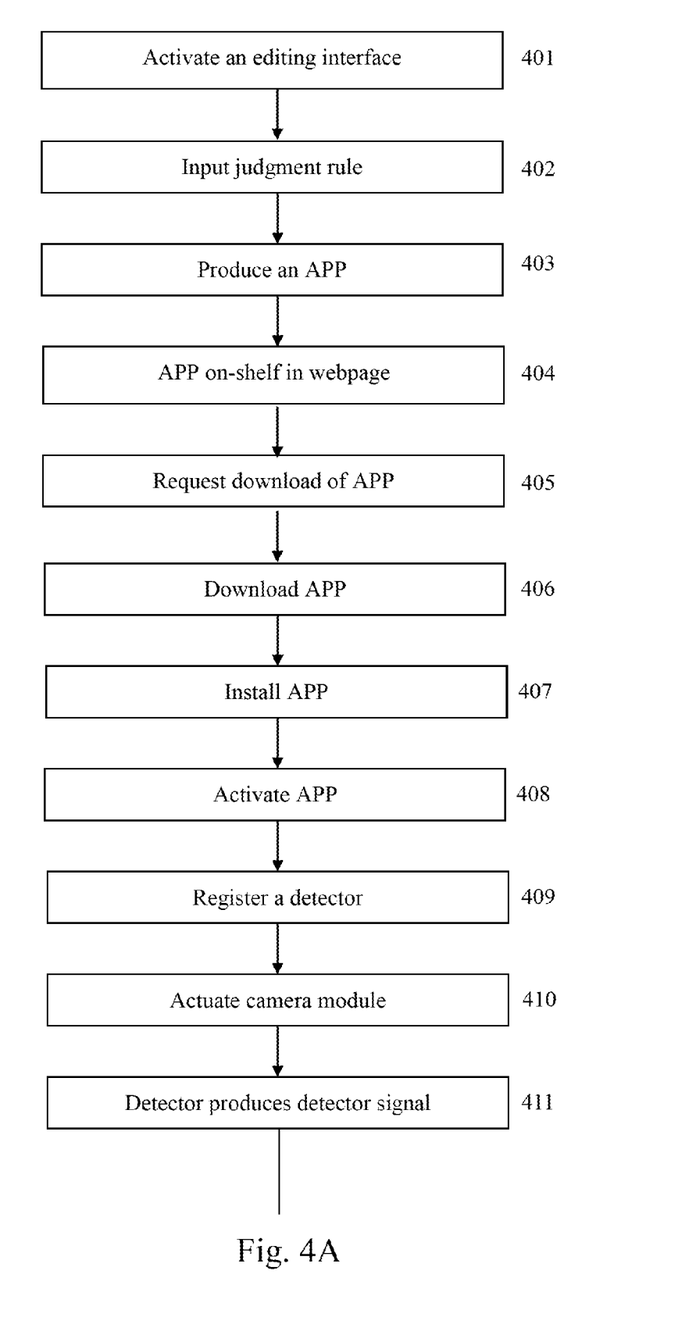
FIGS. 4A and 4B show the flowchart of an application of the service platform for general-purpose multi-functional detectors of the present invention.
Figure 4B:
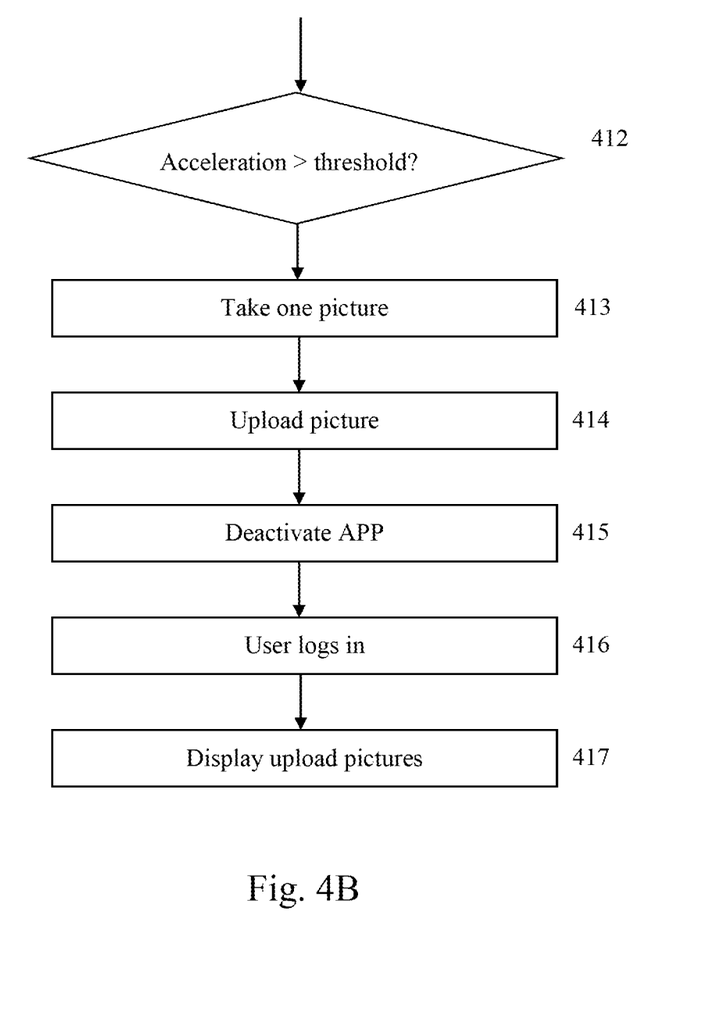

FIGS. 4A and 4B show the flowchart of an application of the service platform for general-purposed multi-functional detectors of the present invention. It is appreciated that the flowchart is used to illustrate a particular example of the application of this invention. The steps and their sequence may alter in a various way in actual applications.

As shown, in step 401, a developer logs in the editing module 130 and selects the editing interface 131 to establish an application program, by entering name of the application program as "Selfie as You Wish." At 402 the developer inputs an application program containing the following judgment rule in the editing interface 131:

When an acceleration value generated by a particular detector exceeds a threshold value, actuate the camera module of the mobile device to take a picture.

At step 403, the editing module 130 includes the judgment rule and other necessary information, such as ID code of a detector, other necessary parameters of the application program, screen displays of the application program etc. to produce an application program called "Selfie as You Wish." In step 404 the service platform 100 for general-purposed multi-functional detectors puts the completed application program on-shelf in its webpage, for users of mobile devices to download.

In step 405 user A's mobile device 200 connects the service platform 100 for general-purposed multi-functional detectors and requests download of the application program, "Selfie as You Wish." At 406 the service platform 100 for general-purposed multi-functional detectors determines that this application program was defined as downloadable free of charge, therefore provides the application program to A's mobile device 200. At 407 the application program "Selfie as You Wish" is downloaded and installed in the mobile device 200.

In step 408, A activates the application program "Selfie as You Wish." At 409 user A initializes binding procedure for the mobile device 200 and general-purposed multi-functional detector X, to establish communication between them through, for example, a special ID encoded in the detector. The application program "Selfie as You Wish" operates the mobile device 200 to determine that detector X belongs to a type of detector already registered with the service platform for general-purposed multi-functional detectors and that detector X is equipped with an accelerator function, therefore the mobile device 200 registers the detector X. At 410 the application program "Selfie as You Wish" actuates the camera module of the mobile device and the camera module enters into its focusing mode. At 411 user A shakes the general-purposed multi-functional detector X, so that detector X produces a sensing parameter representing an acceleration value of the motion of detector X. The sensing parameter is broadcasted together with the ID code of detector X. At 412 the application program "Selfie as You Wish" receives the signals of detector X and determines that the detector that provides the received signals has registered with the application program A and that the acceleration value is greater than the predetermined threshold value. It therefore operates the camera module to take one picture at step 413. At 414 the application program "Selfie as You Wish" operates to save the image file so obtained at a particular directory of the memory module of the mobile device 200. In step 415, the application program "Selfie as You Wish" determines no further photography is necessary, therefore exits its active mode.

In step 416, user A uses the mobile device 200 to connect the service platform 100 for general-purposed multi-functional detectors and logs in A's account. At 417 the service platform 100 for general-purposed multi-functional detectors actuates the user interface 140 for mobile device users, allowing user A to query pictures that A has uploaded.

As described above, the present invention provides a service platform for general-purposed multi-functional detectors for a large number of mobile devices to connect via a browser installed in the mobile devices, to select and download a selected application program to the mobile device. The service platform provides and manages a plurality of application programs and their relationships with a plurality of general-purposed multi-functional detectors. This invention provides useful tools for application program developers in their design of application programs based on the creative employment, combination or deviation of the detection functions of the general-purposed multi-functional detectors, especially the "multi-functional" feature of the detectors. The application programs so developed are then provided to the great number of mobile device users in the form of "application" (APP), so that the multiple functions of the general-purposed multi-functional detector may be utilized to their extremes.

What is claimed is:

1. A service platform for general-purposed multi-functional detectors, comprising
    a memory device to store a plurality of application programs; and
    a communication module, to establish communication channels with a plurality of mobile devices for exchange of information, including providing an application program to one of said mobile devices;

wherein the application program enables the one mobile device to establish communication capabilities with particular general-purpose multi-functional detectors, so to obtain at least one parameter from the general-purposed multi-functional detectors, after the application program is installed in the mobile device;

wherein the general-purpose multi-functional detector is configured to provide a detector ID code and at least one sensing parameter; and wherein the application program includes at least one judgment rule, including at least one event and one action determined according to an inference using the event as premise; and the event includes a parameter generated by the particular general-purposed multi-functional detectors.

2. The service platform according to claim 1, wherein the judgment rule further includes a logical relationship between a plurality of events.

3. The service platform according to claim 1, wherein a parameter used in the judgment rule includes a sensing parameter of the general-purpose multi-functional detector.

4. The service platform according to claim 2, wherein the logical relationship includes at least one selected from the group consisted of "AND," "OR" and "NAND".

5. The service platform according to claim 1, further comprising an editing module, to allow application program developers to set parameters for a particular application program online.

6. The service platform according to claim 5, wherein the editing module further allows application program developers to develop and edit a particular application program online.

7. The service platform according to claim 6, wherein the editing module comprises a graphical editing interface.

8. The service platform according to claim 6, wherein the editing module automatically adds particular information relating to the general-purposed multi-functional detectors to an application program upon completion of development of the application program, wherein the information comprises information representing a type of the detectors and representative information of detectors connectable to the application program.

9. The service platform according to claim 1, further comprising a user interface for mobile device users, the user interface including a graphical interface and allowing users of the mobile device to log-in and to query and store information relating to the mobile device and particular application programs.

10. The service platform according to claim 1, further comprising a data processing module, to process data obtain by the service platform in accordance with a particular rule.

11. The service platform according to claim 1, wherein exchange of information between the communication module and the plurality of mobile devices includes at least one selected from the group consisted of the followings:

providing information obtained by the mobile device and relating to particular general-purposed multi-functional detectors or the application program to the service platform; and providing information provided by the service platform and relating to particular general-purposed multi-functional detector or the application program to the mobile device.

12. The service platform according to claim 1, wherein the mobile device is provided with a capability of identifying particular general-purposed multi-functional detectors and at least one capability selected from the group consisted of the following capabilities, after the application program is installed in the mobile device:

(1) waking up a general-purposed multi-functional detector;

(2) setting parameters for a general-purposed multi-functional detector and deactivating the setting;

(3) providing particular data to a general-purposed multi-functional detector; and (4) obtaining particular data from a general-purposed multi-functional detector.

13. The service platform according to claim 1, wherein the mobile device is one selected from the group consisted of an smart phone and a tablet computer.

* * * * *